July 30, 1968   A. H. CALMES   3,394,568
APPARATUS FOR ROLLING SEAMLESS TUBES
Filed Dec. 29, 1964   6 Sheets-Sheet 1
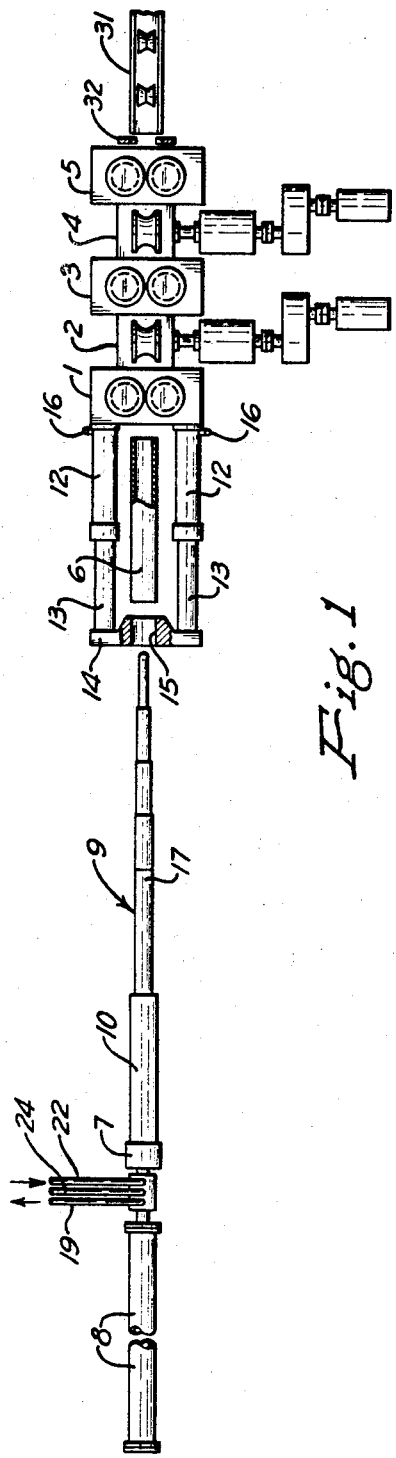
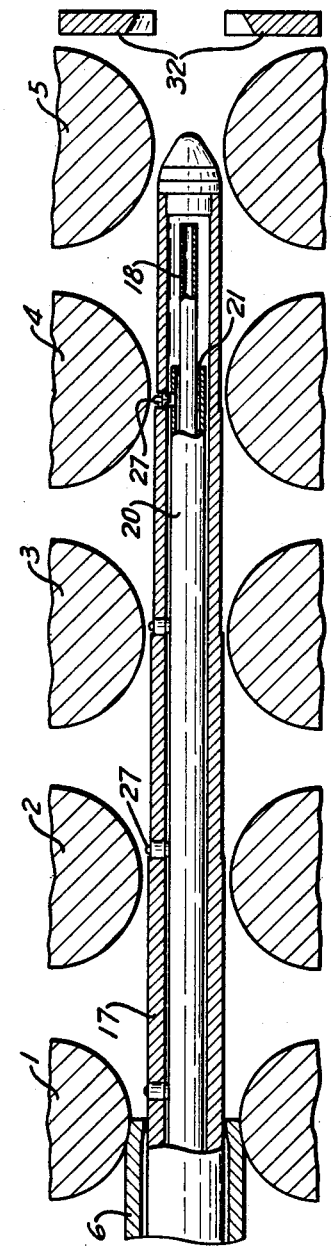
INVENTOR.
ALBERT HENRI CALMES
BY
Brown, Critchlow, Flick & Peckham.
ATTORNEYS.

July 30, 1968  A. H. CALMES  3,394,568

APPARATUS FOR ROLLING SEAMLESS TUBES

Filed Dec. 29, 1964  6 Sheets-Sheet 2

INVENTOR.
ALBERT HENRI CALMES
BY
Brown, Critchlow, Flick & Peckham
ATTORNEYS.

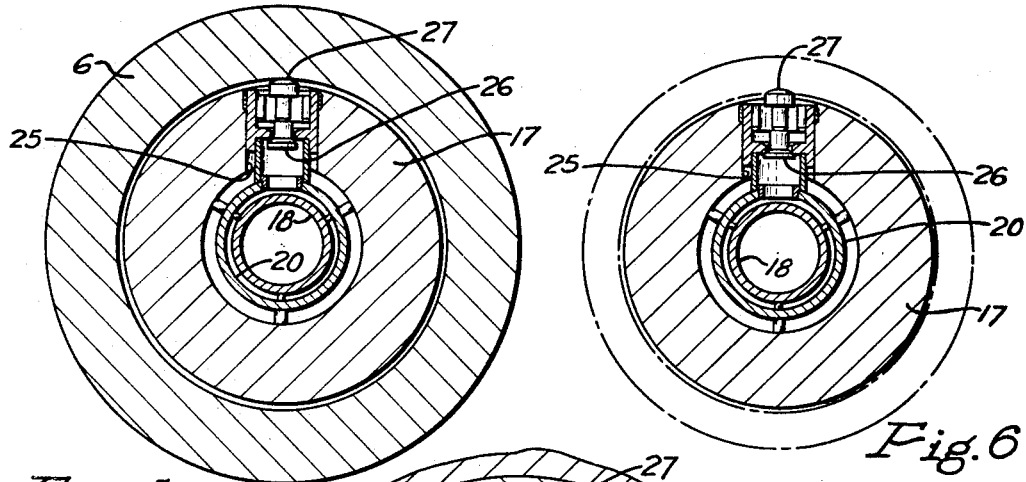
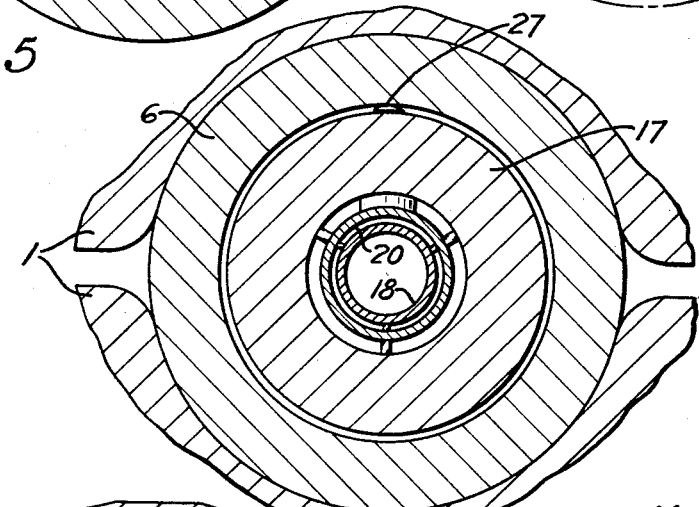
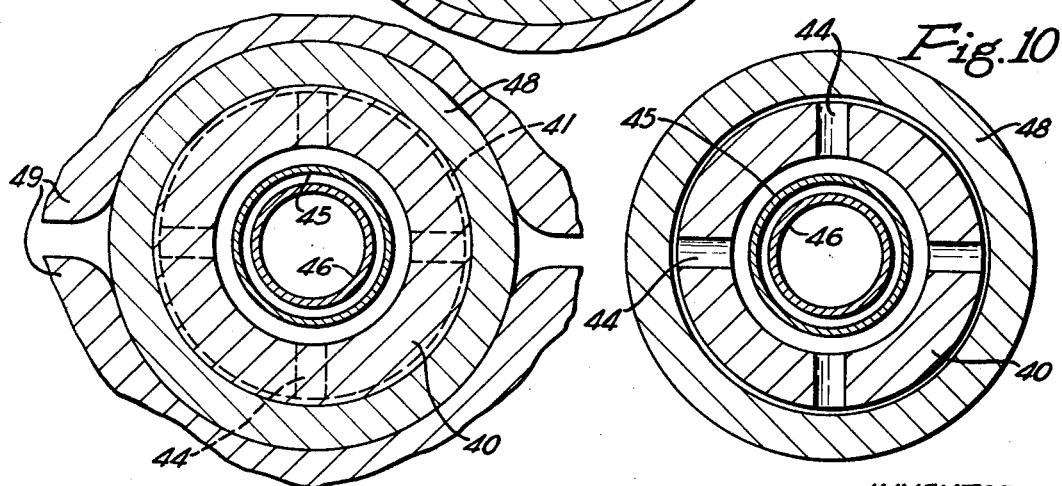

July 30, 1968  A. H. CALMES  3,394,568
APPARATUS FOR ROLLING SEAMLESS TUBES
Filed Dec. 29, 1964  6 Sheets-Sheet 4

INVENTOR.
ALBERT HENRI CALMES
BY
Brown, Critchlow, Flick & Peckham.
ATTORNEYS.

July 30, 1968     A. H. CALMES     3,394,568
APPARATUS FOR ROLLING SEAMLESS TUBES
Filed Dec. 29, 1964     6 Sheets-Sheet 5
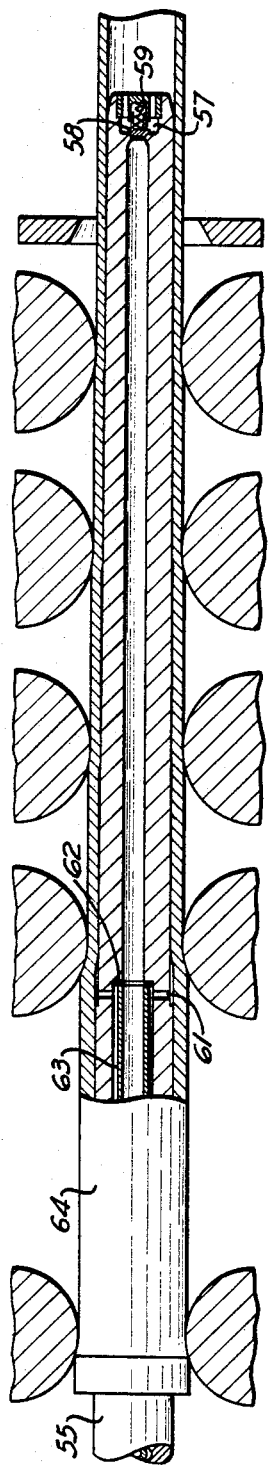
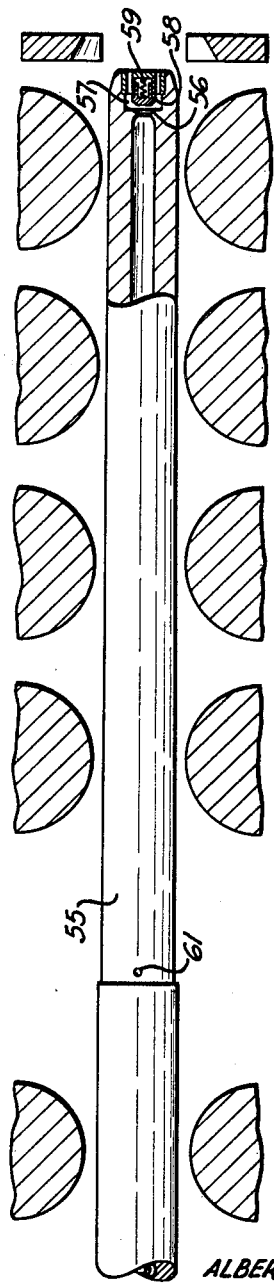
INVENTOR.
ALBERT HENRI CALMES
BY
Brown, Critchlow, Flick & Peckham.
ATTORNEYS.

July 30, 1968  A. H. CALMES  3,394,568
APPARATUS FOR ROLLING SEAMLESS TUBES
Filed Dec. 29, 1964  6 Sheets-Sheet 6
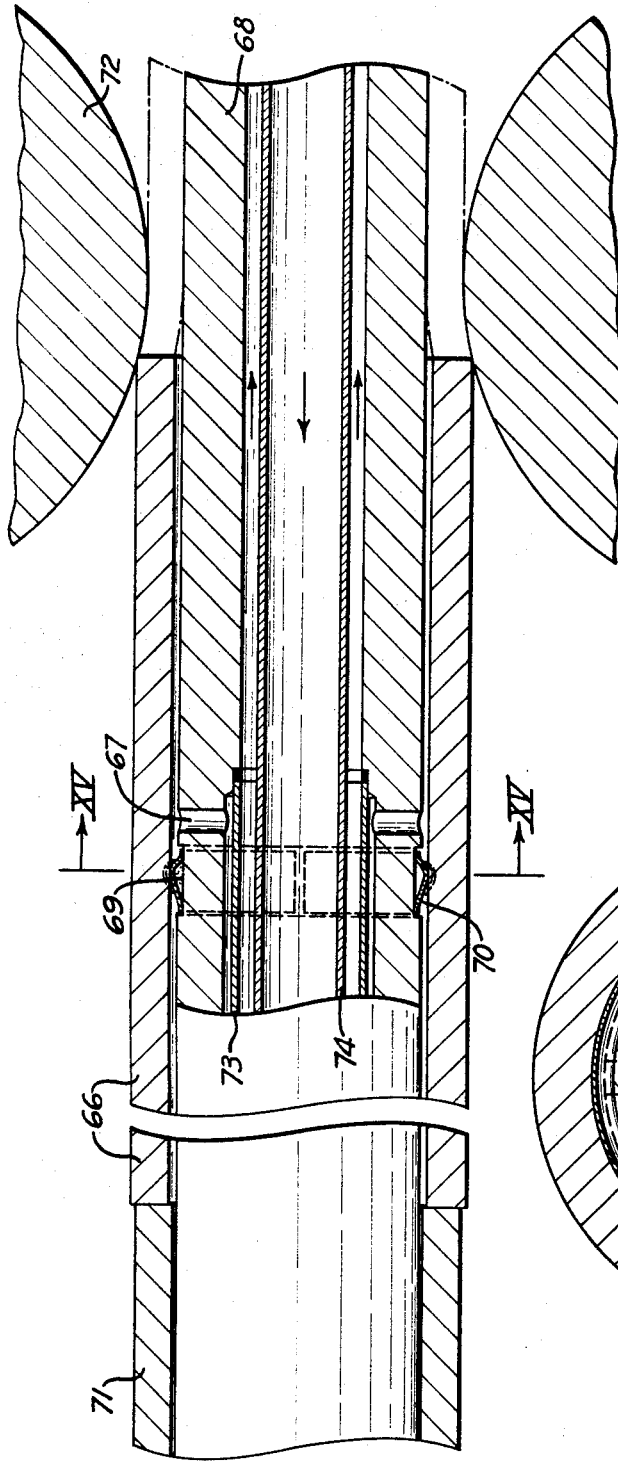
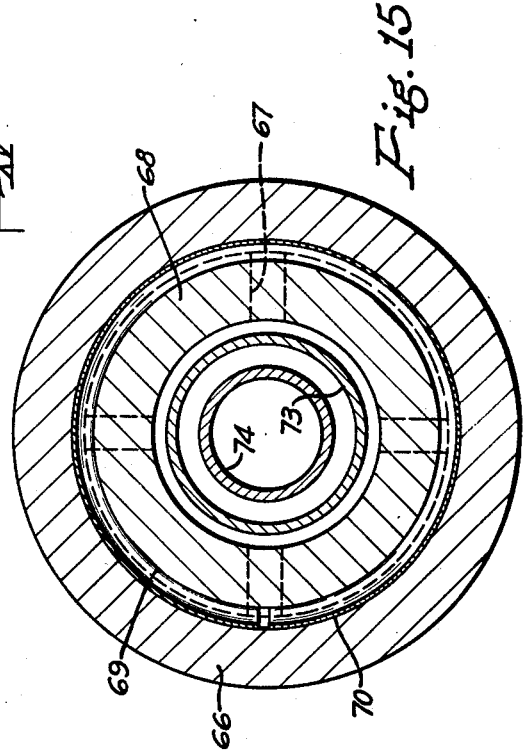
INVENTOR.
ALBERT HENRI CALMES
BY
Brown, Critchlow, Flick & Peckham.
ATTORNEYS.

United States Patent Office 3,394,568
Patented July 30, 1968

3,394,568
APPARATUS FOR ROLLING SEAMLESS TUBES
Albert Henri Calmes, Valais, Switzerland, assignor to Contubind Societe Anonyme, Lausanne, Switzerland, and Lorraine-Escaut Societe Anonyme, Paris, France
Filed Dec. 29, 1964, Ser. No. 421,845
Claims priority, application Great Britain, Sept. 9, 1964, 36,988/64
9 Claims. (Cl. 72—41)

ABSTRACT OF THE DISCLOSURE

A hollow tapered mandrel, adapted to be supported at its rear end and advanced between successive stands of grooved rolls, has a tubular body closed at its front end and provided with openings through its side walls. The mandrel also is provided with a passage for conducting lubricant to its openings, and with another passage for conducting cooling water along the inside of the mandrel.

---

This invention relates to the manufacture of seamless metal tubes, and more particularly to a process in which a hollow tapered mandrel is advanced at a controlled speed through a multistand continuous tube-rolling mill.

It is known that seamless tubes of small diameters can be rolled in a continuous mill on a free floating cylindrical mandrel, which is afterwards extracted from the tubes. Thereafter, the tubes are reheated and reduced in a tube-reducing mill to the desired finished smaller size. Because it is necessary to permit free flow of the steel on the cylindrical mandrel, the roll grooves must be oval in transverse section with large openings at the roll flanks, and thus the rolled products tend to have unequal wall thicknesses and different wall thicknesses at each end.

Tubes of larger sizes can be rolled in a one stand two-high plug mill in two or three passes, using a fixed plug held in the roll pass by an axially compressed bar. Such tubes tend to have uneven walls and inside scratches, so they are subsequently expanded by cross-rolling in a tube reeler over an opposed plug held by an axially compressed bar, in order to iron out the unevenness and the scratches.

There also are known other seamless tube finishing mills, viz., the pilger mill and the push-bench, which have lower output capacities. They present some inconveniences and some advantages relative to the above-mentioned processes.

Multistand plug mills for manufacturing seamless tubes have also been proposed that are provided with plug mandrels held under tension or with plug mandrels and plain mandrels having controlled floating advance in the direction of rolling. It has been proposed to cool the mandrels from the outside, and also from the inside by conducting cooling water through an inner pipe to the forward end of the mandrel and then returning it along the inside of the mandrel to its inlet end. Using the latter method, the inside scale of the hollow body or blank around the mandrel is not eliminated and lubrication tends to be inefficient, being effected by spraying lubricant onto the outside of the mandrel or by the previous introduction of mineral salt or borax into the bore of the blank to be rolled. The result is that wear on the mandrel and the inner surfaces of the finished products is excessive.

Furthermore, it has been proposed to conduct a lubricant through an inner bore and radial ducts in a plug mandrel to the gap between the hollow blank and mandrel in order to create a layer of lubricant between them. This proposal also provides for conducting water under pressure outside a concentric pipe in the inner bore of the mandrel and out through radial ducts ahead of the first rolling plug at the moment when the first stand of rolls reduces the hollow blank, for the purpose of eliminating the scale separating from the inner wall of the blank. The cooling of the rolling plug is effected subsequently, after the rolling, from outside. Such a method leads to loss of time for the outside cooling.

It has also been proposed to conduct a lubricant and cooling water alternately through an inside bore in a plug mandrel for lubricating and cooling the mandrel, and to deliver water under pressure for internal descaling ahead of the first plug through a separate concentric duct. That system results in reduction of the hourly output of tubes and leads to abnormal consumption of lubricants.

It further has been proposed to cool the inside of the plugs, to lubricate them and to descale the inside of the surrounding hollow blanks by conducting pressure water in a single duct system through the mandrel to the plugs. By such a method, the mandrel is intensively cooled from the inside, but the blanks also are intensively cooled. Moreover, lubrication of the plugs by water is inefficient.

All of these proposals permit thick-wall hollow shells to be rolled into tubes if the mandrel bar is replaced frequently, but they do not meet the working conditions necessary for manufacturing thin-wall tubes on a multistand continuous mill, for minimizing the wear of the plugs or the mandrel bars, and for economically manufacturing thin-wall tubes with smooth inside surfaces.

In the manufacture of thin-wall seamless tubes, the working conditions needed for a single hollow mandrel during the rolling operation in order to conserve a smooth surface on the mandrel during its working life and to reduce its wear, thereby producing a high hourly output, are the following:

(1) Above all, between the inner surface of the hollow body or blank and the mandrel there should exist a complete, continuous, separating and lubricating film, in order to avoid heat transmission that would overheat the mandrel, to eliminate adherence of the steel to the mandrel surface, and to decrease efficiently frictional resistance between them.

(2) Using a single mandrel, it has to be cooled continuously and intensively from the inside during the whole rolling cycle in order to avoid creation of high temperatures at its surface and in its mass, which soon would lead to heat tensions and consequently to cracks.

(3) During the rolling of thin-wall tubes, the inner surface of the hollow blank must not come in contact with cool water, because this contact, and especially the formation of steam, would withdraw from the blank important quantities of heat, leading to an inadmissible loss of temperature of the hollow body during the rolling operation.

(4) It is important for the rolling of thin-wall tubes, when high rolling pressures and temperature increases from friction are created, that the working surfaces of the mandrel be gradually changed in order to keep the surface temperatures below the critical values, and that an efficient lubricating and cooling take place during the whole rolling operation.

(5) The scale adhering to the inside wall of the hollow blank being rolled, which increases wear of the mandrel and creates inside scratches through local accumulations on the inside of the tube, has to be detached and eliminated through a gas jet or it must be transformed before the rolling operation into a harmless plastic or liquid substance.

(6) In order to achieve in all the rolling grooves of the mill equal deformation of the work, without dangerous stresses of the steel, and to obtain uniform wall thickness, it is necessary to roll the hollow blank in grooves that are as round as possible with limited roll flank openings. Therefore it is required, or highly desirable, that the plug or mandrel diameters be tapered forward in the rolling direction. This provision also leads to equal end wall thicknesses. The last two roll passes should not have ovaling and rounding roll grooves for the loosening of the tube from the mandrel, but only circular grooves for deformation purposes, in order to achieve a high total elongation in as few rolling stands as possible. The tapering of the mandrel favors its extraction from the tube, notwishstanding the high degree of circumferential contact caused by the circular roll passes.

(7) The dimensions and resistance properties of the hollow mandrel have to be adequate for the fulfilling of the above-mentioned working conditions, in order that it can withstand with a high degree of security the stress and pressure created through the rolling forces and heat tensions.

It is among the objects of this invention, when rolling thin-wall seamless tubes in a multistand continuous mill on a single, tapered, hollow, tension-fixed stepped mandrel or on a hollow plain mandrel advancing at a controlled speed in the rolling direction, to achieve the foregoing seven working requirements in order to manufacture such tubes with uniform wall thickness and to maintain the mandrel and the inside of the finished tubes smooth, with a most economical consumption of mandrels and a high hourly output of tubes.

The invention is illustrated in the accompanying drawings, in which

FIG. 1 is a view of a five stand continuous mill, showing the mandrel and the hollow blank at the start of a rolling cycle;

FIG. 2 is an enlarged fragmentary longitudinal section of the mandrel and work piece starting to be rolled in rolling grooves represented schematically by the inner diameters of the grooves, shown for convenience as lying in a common plane;

FIGS. 5, 6 and 7 are enlarged cross sections taken on the lines V—V, VI—VI and VII—VII, respectively, of FIG. 3;

FIGS. 10 and 11 are cross sections taken on the lines X—X and XI—XI, respectively, of FIG. 8;

FIG. 12 is a view similar to FIG. 9, but illustrating another embodiment of the invention;

FIG. 13 is a view similar to FIG. 12, but after completion of the rolling and removal of the tube from the mandrel;

FIG. 14 is an enlarged longitudinal section of a still further modification of the mandrel, showing a hollow body about to enter between the first pair of rolls; and FIG. 15 is a cross section taken on the line XV—XV of FIG. 14.

Figure 3:
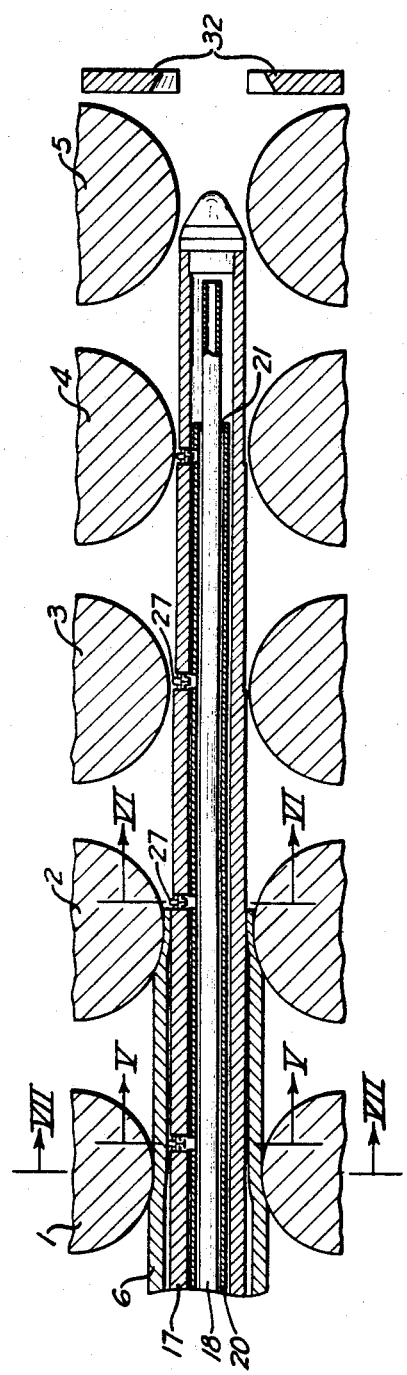
FIG. 3 is a view similar to FIG. 2, showing the hollow blank as it starts to pass between the second pair of rolls.

Referring to FIG. 1 of the drawings, a continuous tube mill is shown consisting, for example, of five two-high stands of driven rolls 1, 2, 3, 4 and 5, with the axes of the rolls in the second and fourth stands perpendicular to those of the other stands. However, there can be more than two rolls per stand if desired. Each stand of rolls is provided with roll grooves that form a circular roll pass. At the entrance end of the mill a heated tubular, cylindrical body or blank 6 is disposed, ready to be fed into the mill. Spaced a considerable distance behind the blank is a carriage 7 that can be moved toward and away from the mill by any suitable means, such as by a fluid pressure cylinder 8. Secured to the front of the carriage and extending toward the mill is a mandrel 9. The rear portion of the mandrel is encircled by a cylindrical pusher or ram 10 that is engaged by the carriage. The mandrel is small enough to be projected through the hollow blank 6, and the ram is large enough to engage the rear end of the blank. If the cylindrical body or blank is taken directly from the mill shown in my copending patent application, Serial Number 379,834, from which the body exits at high temperature, no reheating of the body before entering the present mill will be required. Also, the concentric side walls and even ends of the cylindrical body produced in the other mill are desirable features for the bodies fed to the mill disclosed herein.

Attached to the entrance end of the mill at opposite sides of the blank are double-acting hydraulic cylinders 12, from which plungers 13 extend back toward carriage 7. The outer ends of the plungers are connected by a crosshead 14 provided with an opening 15 large enough to receive the ram, but too small to permit the carriage to pass through it. After the carriage has been moved forward against the crosshead, the speed of the continued forward movement of the carriage is controlled by the rate of escape of fluid from the inner ends of the two cylinders through suitable throttling valves 16. Therefore, the cylinders control the advance of the mandrel through the mill and actually compel it to move at a very slow speed compared to that of the front end of the elongating blank. Also, by delivering fluid under pressure to the front ends of cylinders 12 through wide-open valves 16, the crosshead will push the carriage backward away from the mill and thereby withdraw the mandrel from the mill.

It is a feature of this invention that the mandrel is hollow, as shown in FIGS. 2 to 7, having a tubular body 17 closed at its front end, and that a concentric pipe 18 extends forward through the body to a point near its front end. The outer or rear end of the pipe may be connected with a flexible drain hose 19 (FIG. 1). Encircling this center pipe is another pipe 20 that is concentric with the first one and that is spaced from it and from the inner surface of the mandrel body. The annular space between the front ends of the two pipes is closed by a suitable sealing ring 21. The passage formed between the outer pipe and the mandrel body is connected at its rear end with a flexible hose 22, through which cooling water under high pressure is supplied to the mandrel. The water flows to the front end of the mandrel body and then returns through the center pipe to the drain hose, thereby continuously cooling the mandrel.

The rear end of the passage formed between the two pipes in the mandrel body may be connected to a flexible hose 24 (FIG. 1), through which a suitable lubricant is supplied under high pressure. The lubricant can be a mixture of graphite, wood sawdust and heavy oil, or graphite, wood sawdust and cheap waste grease. In such a mixture the graphite is the real lubricant, the sawdust the filling substance, and the heavy oil or grease the transport element. Other examples of lubricants are mineral salt, borax, specific glass powder, silicates or metal oxides with a low fusion point and high protective and lubricating properties. To allow the lubricant to reach the outer surface of the mandrel, the side wall of the mandrel body is provided at predetermined axially spaced locations with outlet openings 25 that are connected by valves with ports in the side of the outer pipe 20. As shown in FIG. 6, these valves normally are closed by movable valve members 26 pressed outwardly against their seats by the pressure of the lubricant behind them. The valve stems are provided with heads 27 that extend outwardly beyond the periphery of the mandrel body. When these heads are pushed inwardly, as shown in FIG. 5, the valves are opened to permit lubricant to be forced out through the side of the mandrel. The mandrel shown is preferably stepped down forward to form, in effect, a series of long plugs connected by radial or annular steps. All but the reamost valve is located at the base of a step. The plugs and the rest of the mandrel body behind them are tapered forward to a slight extent to facilitate stripping of finished tubes from the mandrel.

To form the heated cylindrical tubular blank 6 shown in FIG. 1 into a thin walled seamless tube 30 (FIG. 4), the mandrel carriage 7 is moved forward rapidly by cylinder 8 to pass the mandrel through the blank until the front end of ram 10 engages the back of the blank and starts to move the blank forward with the mandrel. Continued advance of the ram will now push the blank into the grooves of the first stand of rolls 1, which thereupon grip the blank and contract it upon the mandrel as shown in FIG. 2. These rolls can be designed to sink the blank onto the mandrel or merely to reduce its diameter to the point where there is only a thin annular gap between the blank and mandrel. Reduction of the wall thickness of the blank is not the purpose of this first stand of rolls.

The blank continues to move forward on and with the mandrel in order to enter the roll pass formed by the second stand of rolls 2, as shown in FIG. 3, which is the first pair of reducing rolls. At this time the mandrel carriage 7 engages the crosshead 14 of the feed-limiting device for the mandrel, which thereafter reduces and controls the speed of advance of the mandrel through the mill so that by the time the rear end of the tube 30 rolled in the mill leaves the last roll pass between rolls 5, each valve head 27 will have moved forward to the next roll pass. However, the advancing valves do not move so far forward as to enter the roll passes during rolling, as that would result in the tube being rolled onto the valves, which must not occur. The controlled advance of the mandrel during rolling changes continuously the surface of the mandrel in each roll pass where the rolls are working the metal being rolled therein, and this change avoids excessive surface temperatures on the mandrel which would alter its composition and reduce its resistance to wear.

Figure 4:
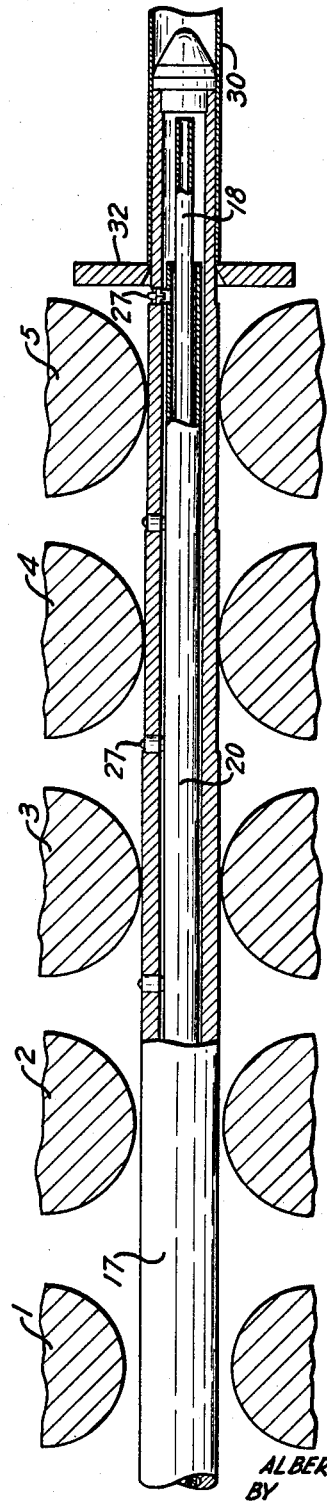
FIG. 4 is a view similar to FIG. 2, showing completion of the rolling operation and beginning of the mandrel-extracting operation.
Figure 8:
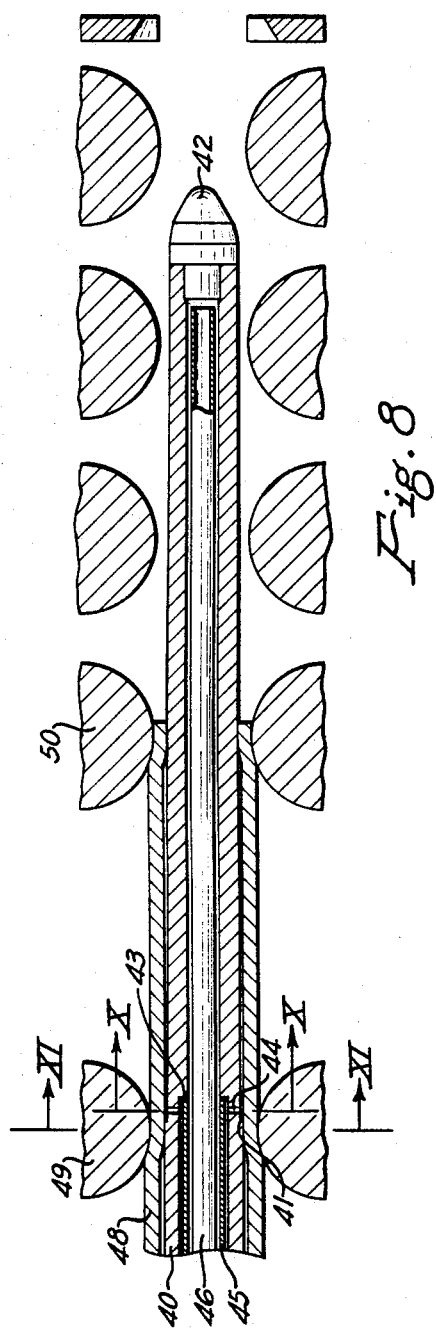
FIG. 8 is a view similar to FIG. 3, but showing a modification.

After the tube, supported by a run-out table 31 or the like, leaves the last pass, cylinder valves 16 are opened wide to permit the mandrel to be advanced rapidly a short distance until the rear end of the tube has been carried by the mandrel past a pair of spaced stripper plates 32. The mandrel then stops, the stripper plates are moved toward each other by any suitable means to engage the mandrel behind the tube as shown in FIG. 4, and then the mandrel is retracted rapidly to pull it out of the tube, which is held stationary by the plates. In place of using the stripper plates, the tube could be loosened from the mandrel by passing the tube through two final roll stands provided with oval and round passes that do not reduce the tube. As soon as the mandrel has been withdrawn from the tube, the rear end of the tube can be cropped if desired.

During the rolling operation, continuous and intensive cooling of the inside of the mandrel is carried out by conducting water under high pressure through flexible hose 22 into the rear end of the mandrel passage that encircles both pipes inside of the mandrel body. The water flows forward through this passage against the inner surface of the mandrel body until it reaches the front end of central pipe 18. The water then returns through this pipe to the rear end of the mandrel and the drain hose 19. The water maintains a constant low average temperature of the mandrel and thereby permits the use of a single mandrel. The cooling prevents temperature build-up in the mandrel, which would lead to outside surface cracks. It will be noted that none of the cooling water comes in contact with the inside of the hollow blank or the tube.

Simultaneously with this cooling, lubricant is delivered to the rear end of the passage between pipes 18 and 20 and flows forward to the various discharge openings 25 in the wall of the mandrel. As soon as the front end of the blank leaves the blank-contracting stand 1, it engages the first valve head 27 and depresses the associated valve member to allow the lubricant to flow out through the valve and into the gap around the mandrel between it and the inner surface of the contracted blank. Through the initial combustion and the later decomposition of the heavy oil in the lubricant, a gas current is formed that flows backward between the mandrel and blank and carries with it the scale, which is detached as the blank passes through the first roll stand, to the rear end of the hollow blank and out of it. The graphite, and the carbon formed from the sawdust and cracking of the heavy oil, are deposited on the inner surface of the hollow blank and on the first mandrel plug for complete and efficient lubrication of the plug.

During further advance of the blank through the roll stands, the successive lubricant-discharge valves are opened by the front end of the advancing tube and they distribute the lubricant under high pressure, in the way just described, between the blank and the mandrel. Therefore, all of the spaces between the blank and mandrel plugs are filled completely with the lubricant to provide layers of lubrication and thermal protection for the long tapered plugs. Back flow of lubricant through the feeding system is prevented by a conventional check valve in the system. Between each pair of reducing stands the lubricant-filled gap around the mandrel is shortened by the advancing mandrel, and this helps to force the lubricant forward into the roll pass to create a continuous separating and lubricating film. As the rear end of the tube being rolled passes each valve, that valve is closed automatically by the outward pressure of the lubricant against the valve member 26. Through this automatic opening and closing of the valves, a most efficient lubrication is obtained with economical consumption of lubricant. The speed of advance of the blank between the first and second roll stands is related to the chemical and physical properties of the lubricant, because there should be enough time for the lubricant that has been introduced into the gap between mandrel and blank to attain the desired fusion temperature and the related properties of lubrication before it reaches the second stand.

By using outwardly opening spring-closed valve members, they could be opened by increasing the lubricant pressure to a predetermined value instead of by the leading end of the blank depressing heads 27.

Instead of the examples of lubricants given above, the lubricants may be formed from many other substances, as long as they provide the necessary thermal protection, lubrication and the transformation of the solid scale in a short contact with the hot hollow blank. The efficiency of the lubricant can be enhanced by chrome-plating the outer surface of the mandrel, or by applying a coating of ceramic, plastic or similar substances with lower friction coefficients than steel mandrels have. This measure contributes not only to a smoother inner surface of the tube being rolled, but also provides a smoother outer surface because the reduction of the coefficient of friction of the mandrel allows a proportionately lower coefficient of friction of the rolls, which permits the use of smoother roll surfaces.

This apparatus allows seamless tubes with smooth inner surfaces to be manufactured at low costs for tools, power and labor. Long tubes can be produced for introduction into a stretching mill without further heating. By using the continuous mill with a tapered mandrel and a stripper that permits the mandrel to be extracted from the tube, the rolls can form substantially closed passes that will deform without harm cheap raw material, such as square continuously cast blooms.

The modified mandrel shown in FIGS. 8 to 11 is advanced slowly between the rolls during rolling in the same manner as the mandrel first described herein. The modified mandrel body 40 likewise is tapered, but it is provided with only a single radial step 41 that separates the rear portion of the mandrel from a long front portion of reduced diameter. The tubular body of the mandrel is closed at its front end by a conical plug 42. The front portion of the mandrel body has a smaller inner diameter than the rear portion. The two inner surfaces are connected by a radial shoulder 43 a short distance in front of the step. Between the step and shoulder there are radially spaced openings 44 in the side wall of the tubular body. The inner ends of these openings connect with a passage formed around a pipe 45 spaced from the inner surface of the madrel body and joined at its front end to the shoulder. The rear end of this passage is connected to a source of supply of lubricant under pressure. Disposed inside pipe 45 and spaced therefrom is a center pipe 46 that extends forward in the mandrel to a point near its front end. While the mandrel is being advanced slowly through the mill, efficient and intensive inside cooling is achieved by introducing cooling water under pressure into the rear end of the passage between the two pipes so that it will flow forward in the mandrel to cool it and then back through the center pipe to a suitable drain or cooler and recirculator.

Figure 9:
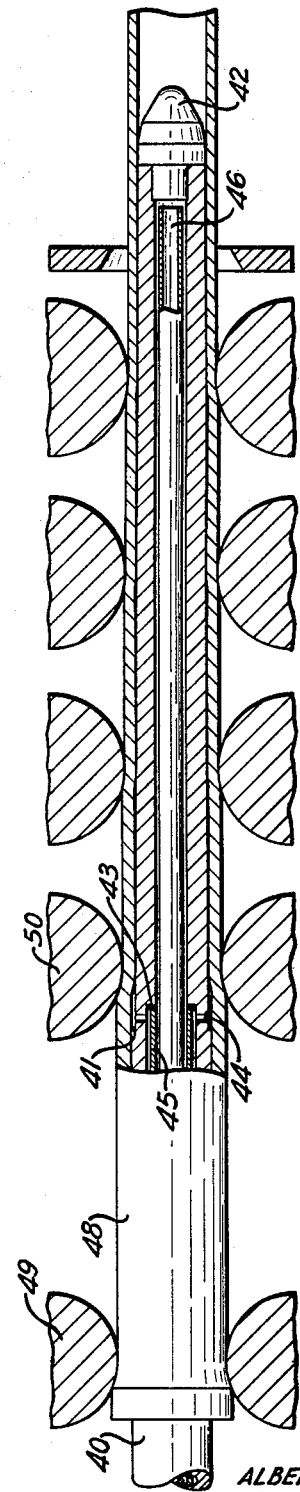
FIG. 9 is a view similar to FIG. 8, but showing the operation further along.

As soon as the hollow blank 48 has been contracted onto the mandrel behind the lubricant openings by the first stand of rolls 49, lubricant is forced out through the openings under the control of any suitable automatic timer (not shown), so that the lubricant will fill the gap formed between the advancing tubular blank and the mandrel. This gap is completely filled because it is closed at its rear end at step 41, and is closed at its front end because the second stand of rolls 50 (the first reducing stand) rolls the front end of the blank against the mandrel. Of course, the lubricant feeding system is provided with a check valve to prevent back flow of the lubricant put under high pressure. As the mandrel advances, the lubricant-filled gap is gradually shortened as shown in FIG. 9, so that the lubricant is pushed along by the mandrel step 41 and rolled into a layer between the hollow blank and mandrel for the thermal protection and lubrication of the mandrel. The inside wall of the blank will not be descaled by a gas current, but existing scale is made innocuous by introducing in any suitable manner mineral salt, borax and coal dust or similar material into the hollow blank before it is charged into the mill.

The external shape of the hollow tapered mandrel shown in FIGS. 12 and 13 is substantially the same as the one just described, except that the front end of the body 55 of the mandrel is not closed by a fixed plug. Instead, it is provided with a forwardly facing valve seat 56 (FIG. 13), in front of which there is a socket 57 containing a valve. A movable valve member 58 is pressed against the seat by a coil spring 59. Just in front of the inner ends of the lubricant openings 61 in the side wall of the mandrel body 62 connecting the two inside diameters of the body. Joined to this shoulder is the front end of a pipe 63 that extends rearwardly through the mandrel body in spaced relation therewith. Lubricant under pressure is supplied to the outer or rear end of the passage between the pipe and the surrounding inner surface of the mandrel body. The lubricant is ejected from openings 61 into the gap between the mandrel and tubular blank 64 in the same way and with the same results as explained in connection with FIGS. 8 and 9. However, cooling of the mandrel is different.

Thus, cooling water is supplied to the outer end of pipe 63, but at a pressure low enough to prevent it from opening the valve at the front end of the mandrel. The mandrel therefore is filled with water throughout the rolling operation, but during that period the water does not circulate into and out of the mandrel. As soon as the rolling operation has been completed and the mandrel has been retracted to extract it from the rolled tube, the pressure of the cooling water is increased sufficiently to cause it to force valve member 58 off its seat and allow the water to flow out of the front end of the mandrel while the mandrel is being returned to its starting position and while it is waiting to start the next rolling operation.

The main reason for this design of mandrel is to allow the use of small diameter mandrels having outside diameters of two to three inches for the manufacture of small, especially thick wall tubes. The construction of this mandrel can be of a high strength notwithstanding the separate water cooling and lubricating systems within it.

FIGS. 14 and 15 illustrate a tapered mandrel that is provided with its own seal for closing the rear end of the gap that extends forward between the tubular blank 66 and the mandrel from the radial lubricant-discharging openings 67 in the wall of the mandrel body 68. The seal is formed by machining an annular groove 69 in the outside of the mandrel body and mounting an elastic ring 70 in the groove. The ring projects from the mandrel body far enough to snugly engage the inner surface of the tubular blank when the latter is telescoped over the mandrel and pushed forward by a ram 71 encircling the mandrel. The seal prevents flow of the lubricant backward along the mandrel during rolling of the tube, and the seal also forces the lubricant forward between the blank and mandrel as the gap between them is shortened during their advance between the first stand of rolls 72 of the mill. Delivery of lubricant to the gap between the blank and mandrel in FIG. 14 is timed in such a manner that filling of the gap will be completed at substantially the same time the front end of the blank is reduced by rolls 72 and the gap thereby is closed. The lubricant is delivered to the inner ends of openings 67 through a passage formed between concentric radially spaced pipes 73 and 74 mounted inside the mandrel body in the manner also illustrated in FIGS. 8 to 13. Cooling water is forced through the passage between the two pipes toward the front end of the mandrel, and leaves through the center pipe 74.

I claim:

1. A hollow tapered mandrel adapted to be supported at its rear end and advanced between successive stands of grooved rolls as a seamless tube is advanced between the rolls and rolled on it, the mandrel having a tubular body closed at its front end and provided with openings through its side wall, the mandrel being provided with a first longitudinal passage in said body for conducting lubricant under pressure from the rear end of the mandrel to said openings, and the mandrel being provided with a second longitudinal passage in said body isolated from the first passage and extending forward beyond it substantially to the front end of the mandrel for simultaneously conducting cooling water along the inside of the mandrel to remove heat therefrom.

2. A hollow tapered mandrel according to claim 1, provided with an annular step facing forward in order to separate two portions of the mandrel that have different outside diameters, at least one of said openings being located in the smaller diameter portion of the mandrel close to said step.

3. A hollow tapered mandrel according to claim 1, including normally closed valves in said openings in the tubular body, and means normally projecting from the outer ends of said openings and movable inwardly for opening the valves.

4. A hollow tapered mandrel adapted to be supported at its rear end and advanced between successive stands of grooved rolls as a seamless tube is rolled on it, the mandrel comprising a tubular body closed at its front end and having openings through its side wall, a pipe mounted inside said body spaced from its side wall to form a lubricant passage between them extending lengthwise of the mandrel, the front end of the pipe extending past said openings and the front end of said passage being closed, a second pipe extending through the first pipe and spaced therefrom and from the front end of said body to form a passage for conducting cooling water forward in said body around said second pipe and then back to the rear end of the mandrel through that pipe.

5. A hollow tapered mandrel according to claim 4, provided with a single annular step facing forward and separating two portions of the mandrel having different outside diameters, and said openings being located directly in front of the step in the smaller diameter portion of the mandrel.

6. A hollow tapered mandrel adapted to be supported at its rear end and advanced between successive stands of grooved rolls as a seamless tube is rolled on it, the mandrel comprising a tubular body closed at its front end and having openings through its side wall, and a pipe mounted inside said body spaced from its side wall to form a lubricant passage between them extending lengthwise of the mandrel, the front end of the pipe extending past said openings and the front end of said passage being closed, and the inside of said pipe forming a water passage for cooling the mandrel.

7. A hollow tapered mandrel according to claim 6, including a sealing ring mounted on the mandrel body behind said openings to prevent flow of lubricant rearwardly therefrom along the ouside of the mandrel while a tube is being rolled on it.

8. A hollow tapered mandrel according to claim 6, in which the front end of said tubular body is provided with an outlet port, and a normally closed valve for said port, said valve being designed to be unseated only by high pressure cooling water inside said body.

9. A hollow tapered mandrel adapted to be supported at its rear end and advanced between successive stands of grooved rolls as a seamless tube is rolled on it, the mandrel comprising a tubular body closed at its front end and having longitudinally spaced openings through its side wall, a first pipe mounted inside said body spaced from its side wall and closed front end to form a cooling water passage extending forward around the pipe and then back through it to the rear end of the mandrel, a second pipe encircling the first pipe and spaced therefrom and from the side wall of said body to form a lubricant passage between the two pipes, means in front of said openings closing the space between the front end of the second pipe and the first pipe, the second pipe having longitudinally spaced ports in its side wall, and means connecting said ports with said body openings.

References Cited

UNITED STATES PATENTS

| | | | |
|---|---|---|---|
| 2,167,418 | 7/1939 | Findlater | 72—209 |
| 2,167,424 | 7/1939 | Novack | 72—209 |
| 2,237,983 | 4/1941 | Findlater | 72—209 |

GERALD A. DOST, *Primary Examiner.*